(12) United States Patent
Cathro et al.

(10) Patent No.: US 10,002,007 B2
(45) Date of Patent: Jun. 19, 2018

(54) OPERATING SYSTEM (OS) INDEPENDENT DEVICE DRIVERS

(71) Applicant: NCR Corporation, Duluth, GA (US)

(72) Inventors: Ian Cathro, Dundee (GB); Brian Spohn, Suwanee, GA (US)

(73) Assignee: NCR Corporation, Atlanta, GA (US)

( * ) Notice: Subject to any disclaimer, the term of this patent is extended or adjusted under 35 U.S.C. 154(b) by 0 days. days.

(21) Appl. No.: 14/290,091

(22) Filed: May 29, 2014

(65) Prior Publication Data

US 2015/0347157 A1 Dec. 3, 2015

(51) Int. Cl.
*G06F 9/445* (2018.01)
*G06F 9/44* (2018.01)

(52) U.S. Cl.
CPC ........ *G06F 9/44505* (2013.01); *G06F 9/4411* (2013.01)

(58) Field of Classification Search
None
See application file for complete search history.

(56) References Cited

U.S. PATENT DOCUMENTS

| 6,148,346 | A * | 11/2000 | Hanson | G06F 3/038 715/961 |
| 6,547,150 | B1 * | 4/2003 | Deo | G07F 7/1008 235/375 |
| 8,490,868 | B1 * | 7/2013 | Kropf | G07F 19/206 235/379 |
| 2004/0177361 | A1 * | 9/2004 | Bernhard | G06F 9/46 719/321 |
| 2006/0112423 | A1 * | 5/2006 | Villadiego | G06F 21/34 726/9 |
| 2008/0301326 | A1 * | 12/2008 | Han | G06F 9/4413 710/19 |
| 2011/0099547 | A1 * | 4/2011 | Banga | G06F 8/61 717/176 |
| 2012/0117577 | A1 * | 5/2012 | Swinfen | G06Q 30/02 719/328 |
| 2013/0103380 | A1 * | 4/2013 | Brandstatter et al. | G06F 9/45558 703/26 |
| 2014/0096124 | A1 * | 4/2014 | Bond | A63F 13/10 717/171 |

* cited by examiner

*Primary Examiner* — Charles E Anya

(74) *Attorney, Agent, or Firm* — Schwegman, Lundberg & Woessner

(57) ABSTRACT

A device driver is configured to provide access to at least one peripheral device through a normalized interface. A loader is provided with the device driver. When the loader is executed, the loader loads the device driver to an operating system (OS) within its own independent processing context. The interactions through the normalized interface are OS independent.

20 Claims, 7 Drawing Sheets

US 10,002,007 B2

OPERATING SYSTEM (OS) INDEPENDENT DEVICE DRIVERS

BACKGROUND

Application programs often have to interact with peripheral devices, such as printers, card readers, bar code readers, printers, and the like. However, the device drivers operate at the lowest and most secure layer of the Operating System (OS). The OS uses a device driver to issue low-level commands to the devices on behalf of higher-level commands issued from the application programs. This ensures that the devices operate properly (e.g., two applications don't access a device simultaneously corrupting information on the devices) and ensures that the unauthorized operations are not performed by applications, which may also corrupt the devices. It also ensures that applications don't have to issue byte level commands, perhaps, even in binary format to perform operations against peripheral devices.

Generally, device drivers are OS specific, which means a single device distributes a different version of its device driver for each OS that the device is supported by.

A variety of Application Programming Interfaces (APIs) and platforms exist in the industry to create more meaningful interfaces to some classes of peripheral devices and for particular industries. For example, CEN/XFS provides financial applications with a platform for interacting with financial devices, such as Point-Of-Sale (POS) terminals, Automated Teller Machines (ATMs), and the like. CEN/XFS seeks to provide a standard mechanism for accessing a device regardless of the manufacturers of that device. In practice, the hardware vendors have created their own flavors of XFS. Moreover, CEN/XFS is largely tied to the Windows® OS.

OPOS (Object Linking and Embedding (OLE) for retail POS) is a platform specific implementation of UnifiedPOS standard and geared to the retail industry. Manufacturers of devices provide packages of service objects compliant with OPOS.

JAVAPOS®, JAVAPOS® is based on UnifiedPOS and is also used for POS devices accessible from Windows® or Linux®.

The problem quickly becomes noticeable that most platforms and APIs are OS specific, device type specific, and even manufacturer specific. As a result, deploying a new OS or new hardware devices into existing enterprise environments is not seamless and not easily ported. Often legacy applications have to be modified and changed to interact with devices when the OS is updated or when interfaces are changed for supporting third-party APIs.

Moreover, even if device hardware connections are standardized through the industry (e.g., Universal Serial Bus (USB), RS232, etc.) there is no common software driver stack from application interfaces to device firmware. Consequently, drivers for hardware devices cannot be shared across business verticals that wish to share the hardware devices.

Therefore, there is a need for a more generic and robust device driver that is OS independent and sharable across applications.

SUMMARY

In various embodiments, methods and a Self-Service Terminal (SST) for Operating System (OS) independent device drivers are presented.

According to an embodiment, a method providing an OS independent device driver is presented. Specifically, a device driver is configured to provide an application access to at least one peripheral device through the normalized interface. Next, a loader is provided with the device driver that when executed loads the device driver to an operating system (OS) within its own independent processing context; interactions through the normalized interface are OS independent.

DETAILED DESCRIPTION

Figure 1A:
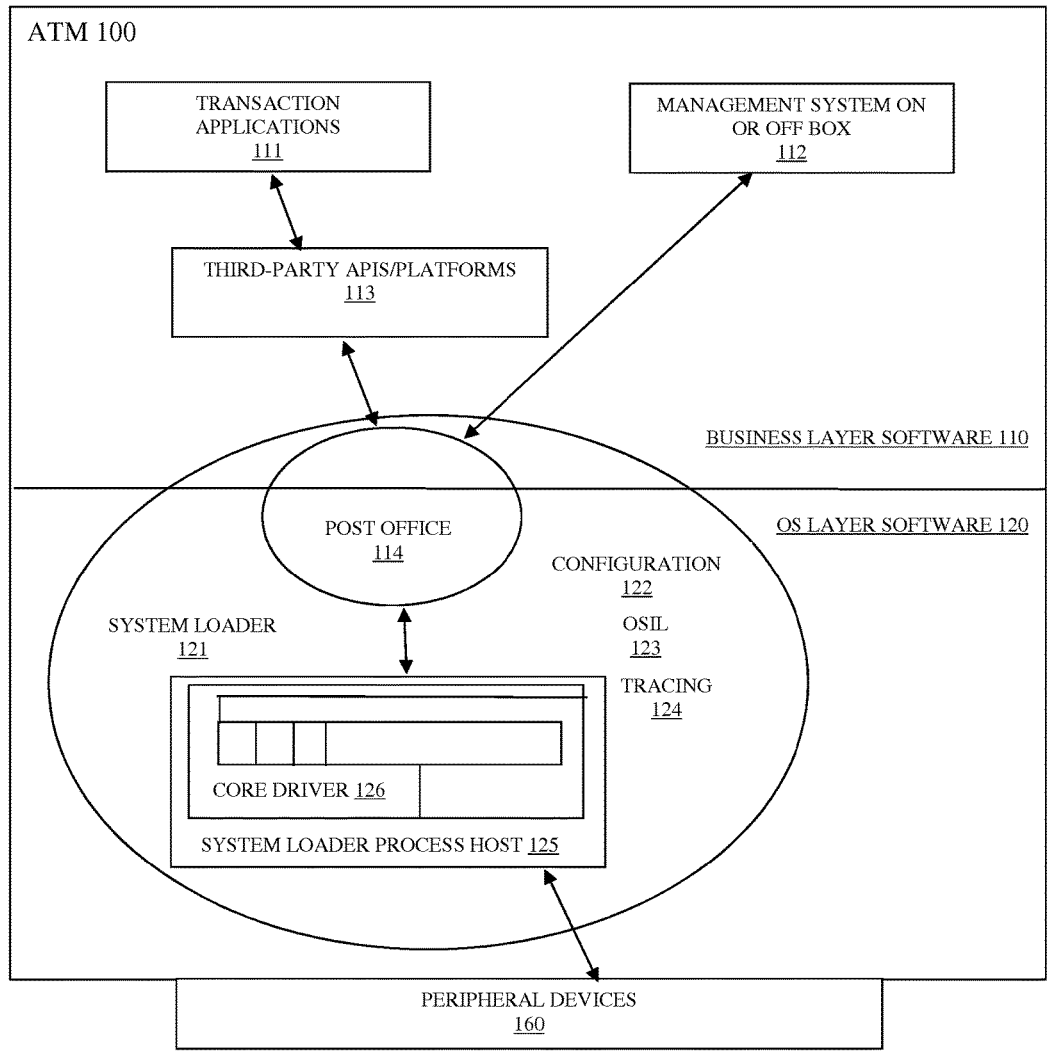
FIG. 1A is a diagram of an Automated Teller Machine (ATM) having an Operating System (OS) independent device driver, according to an example embodiment.

FIG. 1A is a diagram of an Automated Teller Machine (ATM) having an Operating System (OS) independent device driver, according to an example embodiment. It is to be noted that the components system are shown in greatly simplified form, which just those components necessary for understanding the embodiments illustrated.

Before begging the discussion of the ATM 100, some terms are introduced and defined that may be used throughout this document.

A "core driver (may also be referred to by the acronym "CD") is a driver provided or programmed using the framework discussed herein. The CD is OS independent, API independent, independent of any management system, extensible and scalable, includes a system loader, and is installed via a file copy installation. There can be multiple different CDs within a same OS. Moreover, a CD can accommodate: a specific peripheral device, multiple different peripheral device, a class of peripheral device. Moreover, a single CD can be generic and support all peripheral devices within an OS.

As used herein and below a "peripheral device" can be: a physical device, a virtual device being a logical representation of a peripheral device, or a compound peripheral device (a peripheral device that supports two or more discrete, logical device functional operations that have been made independent because of design choice, such as shared Input/Output (I/O) connection or shared transport mechanism).

A "device class" categorizes the type of functionality a device exposes; so, the behavior of the peripheral device is expressed in terms of device class that the peripheral device supports.

A "device subclass" further categorizes the behavioral traits of the peripheral device, which the context of the overall functionality supported by a peripheral device of a particular device class.

A "service function" is a component part of a CD and is responsible for providing a set of pre-defined, standard operations which client users (via applications) can use to perform specific tasks. A CD service function is logically built around a grouping of client user operations (application commands) that collectively provide a client user with a single, yet specific and normalized interface. A client user is said to request a service function to perform an operation and the service function indicates the success or failure of the request in a reply, or response, to the client user. Requests are sent to, and responses are sent from, a service function in the form of bytes of data; known as messages.

A "service function hub" is a component part of a CD. A service function hub provides a means by which several service functions within a CD can be managed and controlled as a collective set. This collection of Service Functions provides the overall functionality that is supported by a CD as a whole.

A "service function hub state listener" receives dynamic notification of the service function hub's state changes as a CD is being started or stopped.

A "service function hub dispatch thread" is an OS independent thread within a service function hub that enables service functions to receive and perform operation requests from client users. Uses a post office service function hub, which allows the receiving and processing of client user requests for multiple Service Functions to be performed in a generic manner on a single thread of execution.

A "post office service function hub" is a component part of a CD and receives the service functions provided by a post office.

A "post office" is the Inter-Process Communication (IPC) OS-Independent message transport mechanism between the applications and the CD. The post office presents an API for message passing and is not concerned with the format of the message or the content of the message.

A "driver request packet (DRP)" is a component part of a CD. A DRP is a transient object created by a service function to perform the operations(s) required by a specific client user request and issue a suitable response to the client user indicating whether or not the operation(s) requested was successful.

A "DRP queue" is a component part of a CD and provides a bridge between a service function hub and the request scheduler, which allows a service function to defer DRP's for processing later by the request scheduler.

A "device-based service function" is a service function that exposes all, or some of, the functionality supported by a CD's underlying peripheral device(s).

A non-device based service function" is a service function that provides functionality that does not require a CD's underlying peripheral device(s).

A "request scheduler" is a component part of a CD and is responsible for managing (sequencing and scheduling) deferred DRPs that have been pushed onto the DRP queue by a service function.

A "driver control" is a component part of a CD and provides the glue between the loader, the CD's device managers, and the CD's service function hub (and its collection of service functions).

A "device manager" is a component part of a CD and provides an interface layer between a CD's underlying device and its other component parts; namely the CD's Service Functions and DRPs.

The "loader" as used herein is a specialized application for loading a CD into an OS environment, which allows the CD to: 1) start during system startup or on demand, with the loader automatically managing any dependencies between other CDs operating within the OS environment; 2) stop during system shutdown or on demand, where the loader automatically manages any dependencies between of other CDs operating within the OS environment; and 3) execute within its own OS process, or in a shared OS process with other CDs, in a configurable manner. The CDs do not operating at the same OS layer or under a same OS process as the applications. This also provides OS independence by having the loader manager the dependencies and provides a mechanism for client software (applications) to determine what CDs are installed and determine a state for a particular CD (started, stopped, etc.).

"Business layer software" refers to the applications and/or management systems processing context and application layer within the OS, which sits above the OS layer software, where the CD is processed.

"Operating System Independent Layer (OSIL)" is a layer or container that houses the system loader, configuration, tracing, CD, and post office. It is OS independent using OS independent message passing from and to the post office to communicate with the client software (applications). To achieve this some low level functions are provided, such as: trace line instrumentation to support tracing components of the CD; configuration predefined via a specification or schema to allow applications at runtime to custom configure the CD; messaging also defined by a predefined specification or schema such that specific tasks can be performed when the CD is instructed and responses sent (the schema for the messages can include a variety of predefined message types as well); serialization that allows software objects to be serialized into a vector of bytes (byte buffer) and de-serialized from a vector of bytes (messages are transported from component to component as a vector of bytes); and a device I/O channel that supports sending and receiving data to and from several physical hardware interconnect types using a generic logical interface (HID, USB, RS232, etc.). These constructs permit the CD to operate in its own processing context similar to a container within any OS.

Moreover, a CD can be customized to add additional functionality or remove functionality during build or even during runtime (dynamically).

It is within this initial context that the FIGS. are now discussed with initial reference to the FIG. 1A.

The ATM 100 includes and is logically segmented into business layer software 110 and OS layer software 120. The business layer software 110 includes a variety of transaction applications 111 (business or client applications relevant to transactions on the ATM 100), a management system on-box of off-box 112 (for management operations of the ATM 100), third party APIs/Platforms 113 (such as XFS, OPOS, JAVA-POS, and all the flavors or personalities associated with modifications/customizations to these third party APIs/Platforms 113).

The OS layer software 120 includes a post office 114 (that can also operate within the business layer software 110 environment to communication with the business layer software 110. Similarly, the OS layer software 120 includes a system loader 121, which can operate within the business layer software 110 to interact with the business layer software 110 (configure the CD 126, provide state, add or remove functionality to the CD 126 at the direction of applications (assuming policy and security conditions permit such operations)).

Moreover, the OS layer software 120 includes configuration utilities 122, OSIL support utilities 123, tracing utilities 124, a system loader process host 125, and the CD 126.

During operation of the ATM 100, the business layer software 110 (111, 112, and 113) make requests for access to the peripheral devices 160 (card reader, value media dispenser, receipt printer, etc.). The transaction applications 111 are coded to communicate with the third-party APIs/Platforms 113 (XFS, OPOS, JAVAPOS, or personalities thereof) to make such requests of the peripheral devices 160. The third-party APIs/Platforms 113 are modified to communicate with the post office 114 using service function calls in the OS-independent messaging format discussed above (byte vectors). The post office 114 relays the messages (without regard to the format of the messages) to the CD 126 where the service function calls (embedded in the messages) are translated into one or more specific commands recognized by the peripheral devices 160. The peripheral device 160 (to which the original transaction application request was directed responds and that response is translated again by the CD 126 into a service function message and message passed back up through the post office 114, though the third-party APIs/Platforms 113 and provided in a format expected by the requesting transaction application 111.

Processing is similarly achieved with the management system on box or off box 112; although in this instance the management system on box or off box is modified to communicate with the post office 114 and receive messages from the post office 114 using service function message passing (byte vector format and OS-independent).

The system loader process host 125 is an OS-independent processing container for the CD 126; that is the CD 126 is hosted as a collection of software modules within the system loader process host 125.

The business layer software 110 and the OS layer software 120 provide a framework and a platform on the ATM 110 for providing OS independent drivers, via the CD 126, to peripheral devices 160 interfaced or integrated within the ATM 110.

In an embodiment, the modules 114, 121, 122, 123, 124, 125, and 126 are provided as software libraries and class objects, such that customization and reuse is achieved by programmers. In an embodiment, the CD 126 is implemented as a set of C++ class objects for programming custom instances of the CD 126. The standard libraries can include the post office 114, system loader 121, the configuration utilities 122, the OSIL utilities 123, and the tracing utilities 124. Moreover, the third-party APIs/Platforms 113 and the management system on box of off box 112 are modified to communicate via OS-independent messages with the post office 114.

Again, it is noted that each CD 126 is customizable and can be developed to support: a single peripheral device 160, multiple different peripheral devices 160, all peripheral devices 160, or classes of peripheral devices 160.

When a CD 126 is developed some core components are present when a CD 126 is instantiated from the provided software classes and libraries. These core components are illustrated in the FIG. 1B.

Figure 1B:
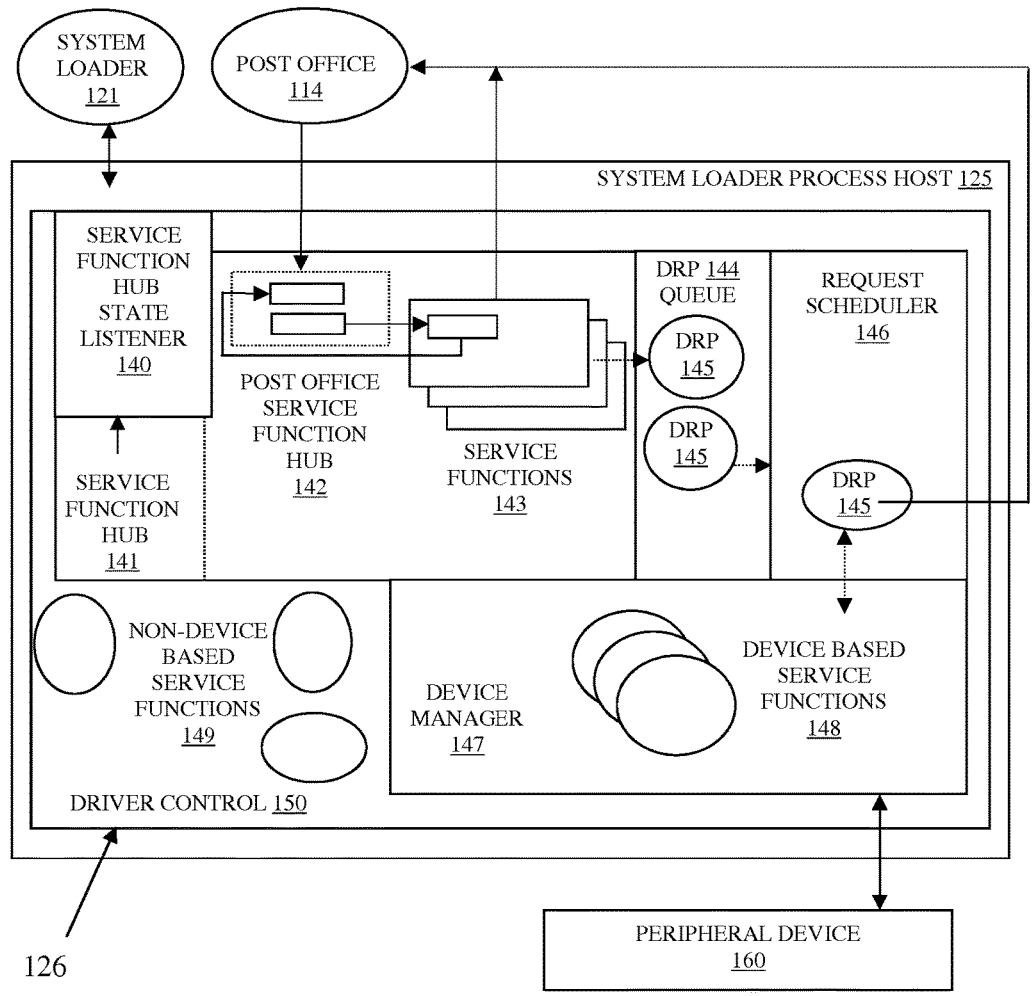
FIG. 1B is a diagram of a module architecture for an OS independent device driver, according to an example embodiment.

FIG. 1B is a diagram of a module architecture for an OS independent device driver, according to an example embodiment.

Some of the components listed in the configuration of the ATM 100 of the FIG. 1A are re-illustrated again in the FIG. 1B for purposes of the discussion of the core components of a base-line CD 126.

For example, the CD 126 communicates with the peripheral device 160, the post office 114, and the system loader 121 in the same manners discussed above with the FIG. 1A.

Moreover, the CD 126 is a logical collection of software modules that are hosted within the system loader processor host 125 as a self-contained processing context or container.

The CD 126 includes a service function hub state listener 140, a service function hub 141, a post office service function hub 142, a variety of service functions 143, a DRP queue 144, a variety of DRP's 145 at any one time during operation, a request scheduler 146, a device manager 147 device service functions 148, non-device based service functions 149, and a driver control 150.

The service function hub state listener 140 receives dynamic notifications of state changes with the CD 126 from the service function hub 141 as state changes are detected or made to the CD 126 and communicates with the system loader 121.

The post office service function hub 142 receives messages from the post office 114 which are associated with specific service functions 143 and presented as DRPs 145 to the DRP queue 144. The request scheduler 146 manages when DRPs 145 are in need of servicing from the peripheral device 160 of when they are being communicated from the peripheral device 160 and manages the DRP queue 144.

DRPs 145 requiring action from the peripheral device 160 are passed to the device manager 147 where they are translated into device based service functions 148 for specific operations on the peripheral device 160. Responses from the peripheral device 160 are translated back into a DRP 145 and sent to the post office 114 for deliver to the requesting application.

In some instances non-device based service functions 149 are processed (as discussed above). A service function not requiring the peripheral device 160.

The driver control 150 coordinates and drives the components within the CD 126, so that they act collectively and in proper sequence.

Now that the OS-independent CD 126 is understood, an example CD 126 implementation that supports a single peripheral device (FIG. 1C) and that supports multiple different peripheral devices (FIG. 1D) are discussed below.

Figure 1C:
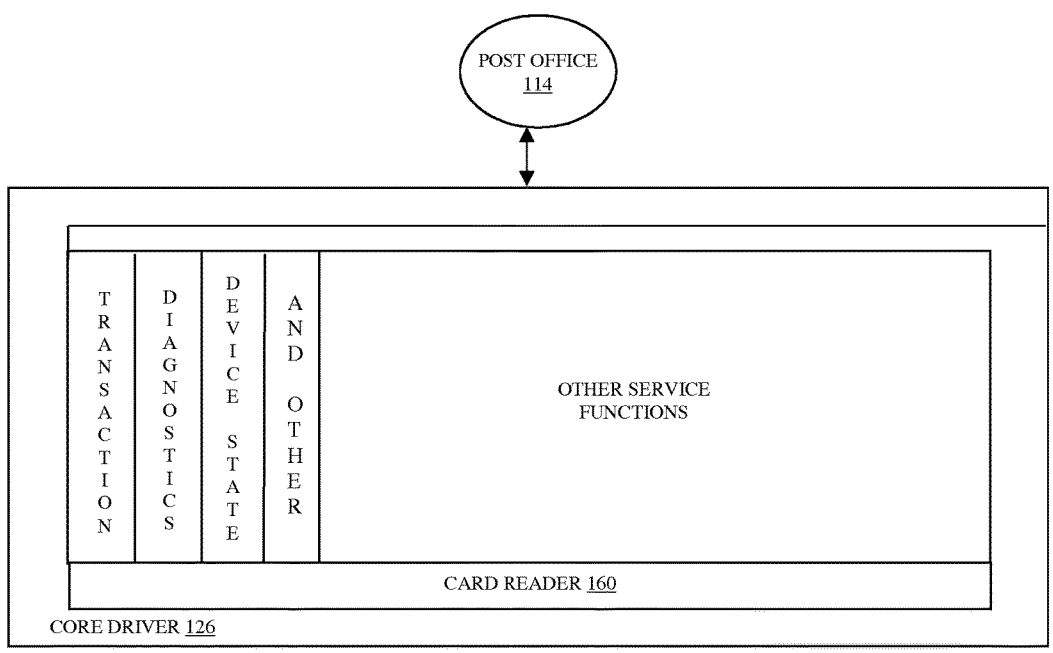
FIG. 1C is a diagram of an OS independent device driver supporting a single device, according to an example embodiment.

FIG. 1C is a diagram of an OS independent device driver supporting a single device, according to an example embodiment.

The CD 126 supports a card reader 160 and four service functions identified as transaction, diagnostics, device state, and other. There may also be other service functions. Communication from the CD 126 is with the post office 114 as discussed above. Moreover, service functions can be dynamically added and removed, such that during run time via the system loader 121, new service functions can be added as slots of functionality within the other service functions space of the CD 126.

Figure 1D:
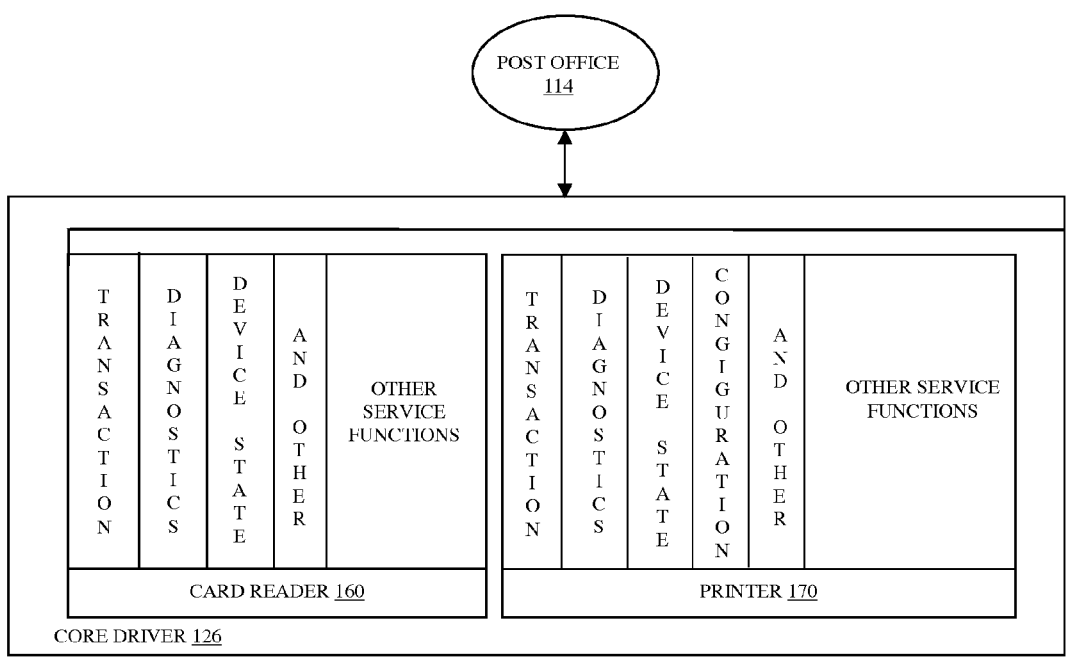
FIG. 1D is a diagram of an OS independent device driver that supports two devices, according to an example embodiment.

FIG. 1D is a diagram of an OS independent device driver that supports two devices, according to an example embodiment.

The CD 126 (OS-independent device driver) supports a card reader 160 and a printer 170. Each peripheral having a set of service functions as illustrated in the FIG. 1D and each having space with the other service functions for dynamic expansion as needed. Again, communication between the two peripherals with applications passes to and from the CD 126 via the post office 114.

Figure 2:
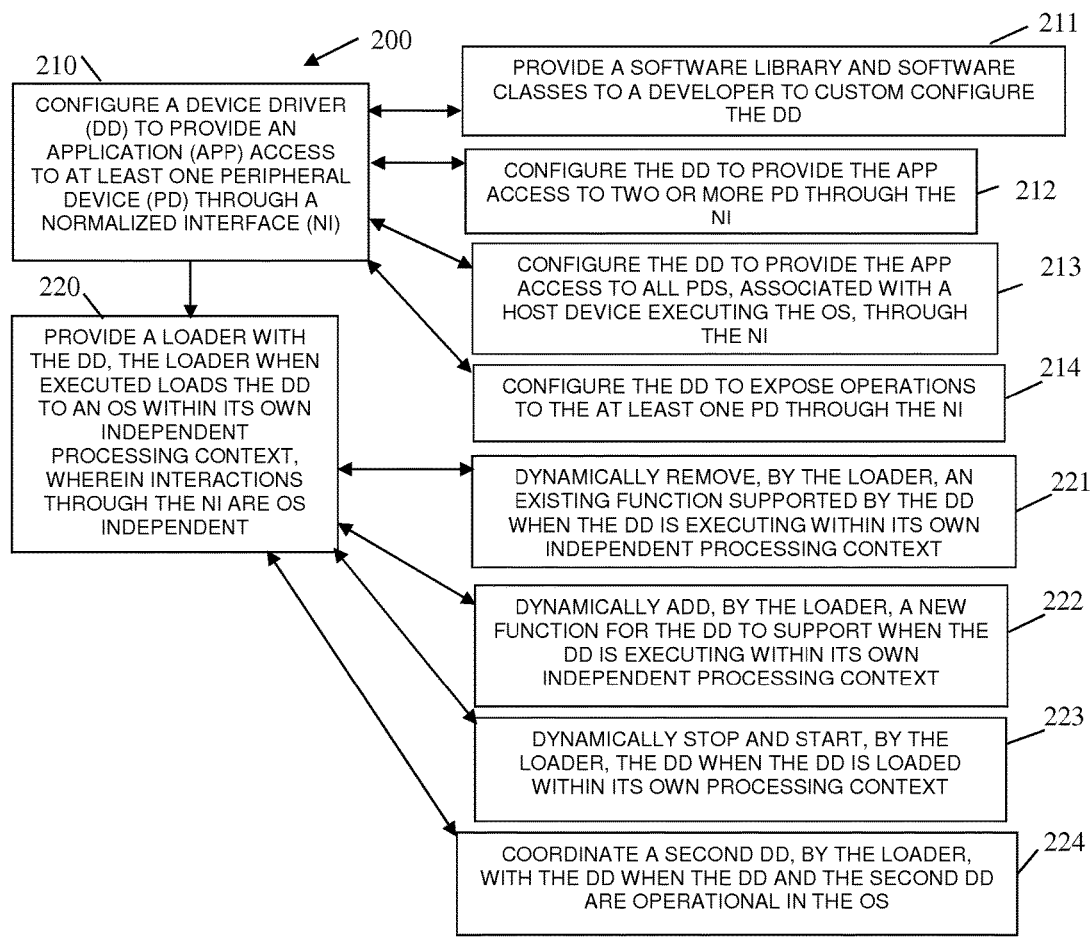
FIG. 2 is a diagram of a method for providing an OS independent device driver, according to an example embodiment.

FIG. 2 is a diagram of a method 200 for providing an OS independent device driver, according to an example embodiment. The method 200 is implemented as one or more software modules as executable instructions that are programmed within memory or non-transitory computer readable storage media and executed by a processing device. The software module(s) are referred to herein as a "device driver configurer." The device driver configurer has access to one or more networks, and such networks may be wired, wireless, or a combination of wired and wireless.

In an embodiment, the device driver configurer produces an instance of the CD 126 discussed above with reference to the FIGS. 1A-1D.

In an embodiment, the device driver configurer produces an instance of a device driver that is OS independent and executes on a host machine that is the ATM 100.

In an embodiment, the device driver configurer produces an instance of a device driver that is OS independent and executes on a host machine that is a Self-Service Terminal (SST).

In an embodiment, the device driver configurer produces an instance of a device driver that is OS independent and executes on a host machine that is a kiosk.

In an embodiment, the device driver configurer produces an instance of a device driver that is OS independent and executes on a host machine that a retail Point-Of-Sale (POS) terminal.

At 210, the device driver configurer configures a device driver to provide an application access to at least one peripheral device through the normalized interface. In an embodiment, the application is the applications of the business layer software of the FIG. 1A. That is, the device driver provides translation between higher-level commands (such as through the service functions discussed above with the FIGS. 1A-1D) and lower-level commands associated with the peripheral device.

According to an embodiment, at 211, the device driver configurer provides a software library and software classes for a developer to custom configure the device driver. So, a toolkit can be used to assemble the device driver having the features discussed above with respect to the FIG. 1B for the core driver 126.

In an embodiment, at 212, the device driver configurer configures the device driver to provide the application access to two or more peripheral devices through the normalized interface (discussed below).

In an embodiment, at 213, the device driver configurer configures the device driver to provide the application access to all peripheral devices, associated with a host device that executes the OS, through the normalized interface.

In an embodiment, at 214, the device driver configurer configures the device driver to expose operations to the at least one peripheral device through the normalized interface.

At 220, the device driver configurer provides a loader with the device driver. The loader when executed loads the device driver to an OS within its own independent processing context. Moreover, the interactions through the normalized interface are OS independent.

In an embodiment, the loader is the loader 121 of the FIGS. 1A-1B.

In an embodiment, the processing context within the OS is maintained by the system loader process host 125 container of the FIGS. 1A-1B.

In an embodiment, the normalized interface is achieved through the service function interface between the business layer software 110 and the device driver and achieved through message independent passing through the post office 114.

In an embodiment, the application is the post office 114, which interacts with other applications of the business layer software 110 of the FIG. 1A.

According to an embodiment, at 221, the loader dynamically removes an existing function supported by the device driver when the device driver is executing within its own independent processing context.

In an embodiment, at 222, the loader dynamically adds a new function for the device driver to support when the device driver is executing within its own processing context.

In an embodiment, at 223, the loader dynamically stops and starts the device driver when the device driver is loaded within its own processing context.

In an embodiment, at 224, the loader coordinates a second device driver with the device driver when the device driver and the second device driver are operational in the OS.

Figure 3:
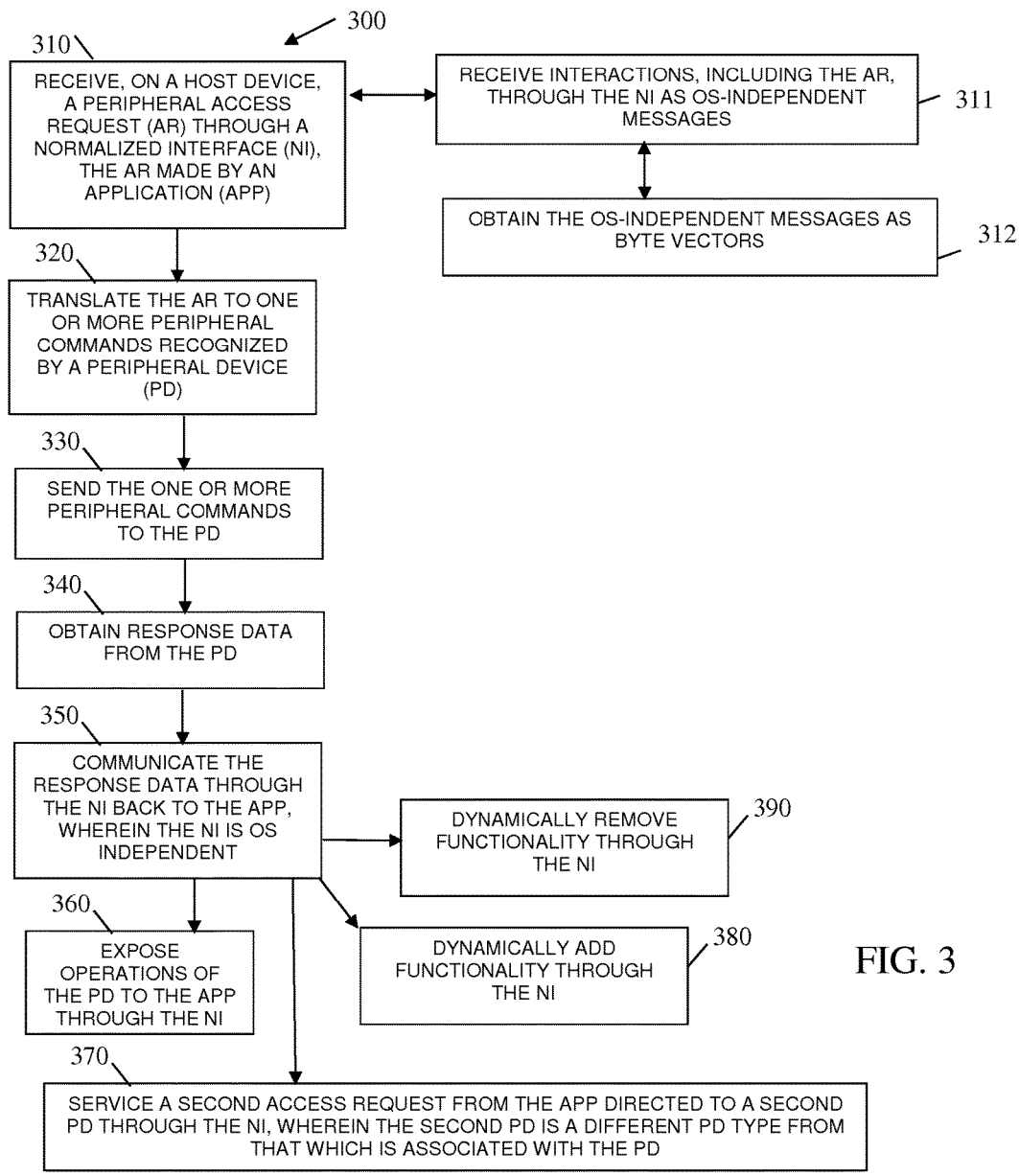
FIG. 3 is a diagram of a method for operating an OS independent device driver, according to an example embodiment.

FIG. 3 is a diagram of a method 300 for operating an OS independent device driver, according to an example embodiment. The method 300 is implemented as one or more software modules as executable instructions that are programmed within memory or non-transitory computer readable storage media and executed by a processing device. The software module(s) are referred to herein as an "OS-independent device driver." The OS-independent device driver has access to one or more networks, and such networks may be wired, wireless, or a combination of wired and wireless.

In an embodiment, the OS-independent device driver is configured by the device driver configurer of the FIG. 2.

In an embodiment, the OS-independent device driver is a specific instance of the CD 126 of the FIGS. 1A-1D.

In an embodiment, the OS-independent device driver executes on the ATM 100.

In an embodiment, the OS-independent device driver executes on a SST.

In an embodiment, the OS-independent device driver executes on a kiosk.

In an embodiment, the OS-independent device driver executes on a retail POS terminal or device.

At 310, the OS-independent device driver receives (on the host device that executes the OS-independent device driver) a peripheral access request through a normalized interface, the peripheral access request made by an application.

In an embodiment, at 311, the OS-independent device driver receives interactions, which includes the peripheral access request, through the normalized interface as OS-independent messages.

In an embodiment of 311 at 312, the OS-independent device driver obtains the OS-independent messages as byte vectors (this was discussed above with respect to the FIGS. 1A-1D).

At 320, the OS-independent device driver translates the peripheral access request to one or more peripheral commands recognized by a peripheral device. This can be achieved via the device manager 147 of the FIG. 1B.

At 330, the OS-independent device driver sends the one or more peripheral commands to the peripheral device in a format recognized and expected by the firmware of the peripheral device.

At 340, the OS-independent device driver obtains response data from the peripheral device in response to the peripheral device processing the one or more peripheral commands.

At 350, the OS-independent device driver communicates the response data through the normalized interface back to the application. The normalized interface is OS independent.

According to an embodiment, at 360, the OS-independent device driver exposes operations of the peripheral device to the application through the normalized interface. This is done through the service functions interface discussed above in the FIGS. 1A-1D.

In an embodiment, at 370, the OS-independent device driver services a second access request from the application directed to a second peripheral device through the normalized interface. The second peripheral device is a different peripheral device type from that which is associated with the peripheral device. This scenario was depicted in the FIG. 1D.

In an embodiment, at 380, the OS-independent device driver dynamically adds functionality through the normalized interface.

In an embodiment, at 390, the OS-independent device driver dynamically removes functionality through the normalized interface.

Figure 4:
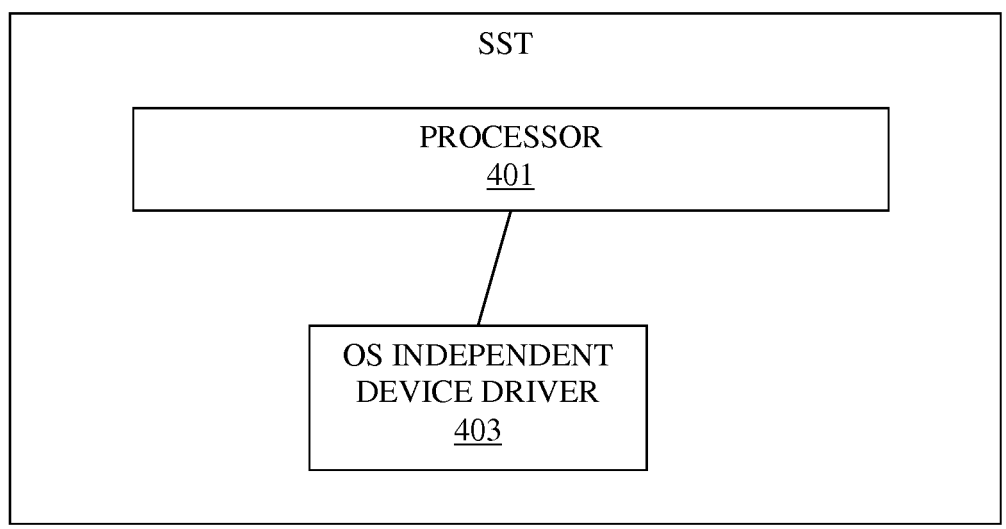
FIG. 4 is a diagram of a Self-Service Terminal (SST) having an OS independent device driver, according to an example embodiment.

FIG. 4 is a diagram of a Self-Service Terminal (SST) 400 having an OS independent device driver, according to an example embodiment. The SST 400 includes one or more hardware devices, one or more peripheral devices, and one or more components implemented as one or more software modules as executable instructions that are programmed within memory or non-transitory computer readable storage media and executed by one or more processors of the SST 400. The SST 400 has access to one or more networks, and such networks may be wired, wireless, or a combination of wired and wireless.

In an embodiment, the SST 400 is the ATM 100.

In an embodiment, the SST 400 is a kiosk.

In an embodiment, the SST 400 is a self-service checkout station.

The SST 400 includes a processor 401 and an OS-independent device driver 402.

The OS-independent device driver 402 is configured and adapted to: execute on the processor within its own independent processing context within an OS for the SST 400 and service an access request made by an application and directed to a peripheral device of the SST 400 through a normalized interface.

According to an embodiment, the OS-independent device driver 402 is further configured and adapted to dynamically remove and add functionality through the normalized interface.

In an embodiment, the OS-independent device driver 402 is further adapted and configured to service a second access request made by an application and directed to a second peripheral device of the SST 400 through the normalized interface.

In an embodiment, the OS-independent device driver 402 is further and adapted to communicate through the normalized interface via OS-independent messages.

One now fully appreciates how a customizable and OS-independent device driver can be configured, loaded, and operated within its own processing context to service one or multiple peripheral devices.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method of configuring and using a device driver to access a plurality of peripheral devices, comprising:

configuring, by a Self-Service Terminal (SST), a core device driver to provide an application access to at least one peripheral device through a normalized interface, wherein the core device driver is independent of an Operating System (OS) and an Application Programming Interface (API);

providing, by the SST, a loader with the core device driver within a container, the loader when executed on the SST loads the core device driver to an OS of the SST within its own independent processing context, wherein the core device driver includes a driver control component that provides a glue between the loader, a core device driver managers and a core device driver service function hub, wherein the core device driver is single generic core device driver that supports a plurality of peripheral devices, wherein providing further includes hosting the core device driver as a collection of software modules from the container on the SST, wherein interactions through the normalized interface are OS independent, and wherein providing further includes processing the loader for loading the core device driver at a different OS layer and as a different process from an OS layer and an OS process associated with the application that accesses the at least one peripheral device through the core device driver;

receiving, on the Self-Service Terminal, a peripheral access request to access recognized by the least one peripheral device by the core device driver;

translating the peripheral access request to one or more peripheral commands recognized by the least one peripheral device by the core device driver;

sending the one or more peripheral commands to the peripheral device by the core device driver;

obtaining response data from the least one peripheral device by the core device driver; and communicating the response data through the normalized interface back to the application by the core device driver, wherein the normalized interface is OS-independent.

2. The method of claim 1, wherein configuring further includes providing a software library and software classes to a developer to custom configure the core device driver.

3. The method of claim 1, wherein configuring further includes configuring the core device driver to provide the application access to two or more peripheral devices through the normalized interface.

4. The method of claim 1, wherein configuring further includes configuring the core device driver to provide the application access to all peripheral devices, associated with a host device executing the OS, through the normalized interface.

5. The method of claim 1, wherein configuring further includes configuring the core device driver to expose operations to the at least one peripheral device through the normalized interface.

6. The method of claim 1, wherein providing further includes dynamically removing, by the loader, an existing function supported by the core device driver when the core device driver is executing within its own independent processing context.

7. The method of claim 1, wherein providing further includes dynamically adding, by the loader, a new function for the core device driver to support when the core device driver is executing within its own independent processing context.

8. The method of claim 1, wherein providing further includes dynamically stopping and starting, by the loader, the core device driver when the core device driver is loaded within its own processing context.

9. The method of claim 1, wherein providing further includes coordinating a second device driver, by the loader, with the core device driver when the core device driver and the second device driver are operational in the OS.

10. A method of configuring and using a device driver to access a plurality of peripheral devices, comprising:
receiving, on a host device that is a Self-Service Terminal (SST), a peripheral access request to access a peripheral through a normalized interface for the peripheral, wherein receiving further includes providing the normalized interface by a core device driver executing on the host device, wherein the peripheral access request made by an application, wherein the core device driver being independent of any Operating System (OS) and Application Programming Interface (API) on the host device and processing the core device driver at a different OS layer and as a different process from an OS layer and an OS process associated with the application that accesses the peripheral through the core device driver and processing the core device driver within a container on the host device, wherein the core device driver includes a driver control component that provides a glue between the loader, a core device driver managers and a core device driver service function hub, wherein the core device driver is single generic core device driver that supports a plurality of peripheral devices, and wherein receiving further includes hosting the core device driver as a collection of software modules from the container on the host device;
translating the peripheral access request to one or more peripheral commands recognized by a peripheral device by the core device driver; sending the one or more peripheral commands to the peripheral device by the core device driver;
obtaining response data from the peripheral device by the core device driver; and
communicating the response data through the normalized interface back to the application by the core device driver; wherein the normalized interface is OS-independent.

11. The method of claim 10 further comprising, exposing operations of the peripheral device to the application through the normalized interface.

12. The method of claim 10 further comprising, servicing a second access request from the application directed to a second peripheral device through the normalized interface, wherein the second peripheral device is a different peripheral device type from that which is associated with the peripheral device.

13. The method of claim 10 further comprising, dynamically adding functionality through the normalized interface.

14. The method of claim 10 further comprising, dynamically removing functionality through the normalized interface.

15. The method of claim 10, wherein receiving further includes receiving interactions, including the peripheral access request, through the normalized interface as OS-independent messages.

16. The method of claim 15, wherein receiving the interactions further obtaining the OS-independent messages as byte vectors.

17. A Self-Service Terminal (SST) for configuring and using a device driver to access a plurality of peripheral devices, the SST comprising:
a memory storing a core device driver and configured and adapted to:
i) execute on the processor within its own independent processing context within an Operating System (OS) and within a container on the SST, wherein the core device driver includes a driver control component that provides a glue between a loader a core device driver managers and a core device driver service function hub, wherein the core device driver is single generic core device driver that supports a plurality of peripheral devices,
ii) service an access request made by an application and directed to a peripheral device of the SST through a normalized interface, wherein the core device driver is independent of any OS and Application Programming Interface (API) and wherein the core device driver processes at a different OS layer and as a different process from an OS layer and an OS process associated with the application that accesses the peripheral device through the core device driver; and
iii) host the core device driver as a collection of software modules from the container; and
a processor executing instructions configured to:
translate the access request to one or more peripheral commands recognized by the peripheral device by the core device driver,
send the one or more peripheral commands to the peripheral device by the core device driver,
obtain response data from the peripheral device by the core device driver, and
communicate the response data through the normalized interface back to the application by the core device driver, wherein the normalized interface is OS independent.

18. The SST of claim 17, wherein the core device driver is further configured and adapted to iii) dynamically remove and add functionality through the normalized interface.

19. The SST of claim 17, wherein the core device driver is further configured and adapted to iii) service a second access request made by an application and directed to a second peripheral device of the SST through the normalized interface.

20. The SST of claim 17, wherein the core device driver is further configured and adapted to, in ii), communicate through the normalized interface via OS-independent messages.

* * * * *